(12) United States Patent
Wolpert et al.

(10) Patent No.: US 12,112,114 B2
(45) Date of Patent: Oct. 8, 2024

(54) HIERARCHICAL COLOR DECOMPOSITION OF LIBRARY CELLS WITH BOUNDARY-AWARE COLOR SELECTION

(71) Applicant: International Business Machines Corporation, Armonk, NY (US)

(72) Inventors: David Wolpert, Poughkeepsie, NY (US); Leon Sigal, Monsey, NY (US); Michael Stewart Gray, Fairfax, VT (US); Mitchell R. DeHond, Essex Junction, VT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 593 days.

(21) Appl. No.: 17/399,397

(22) Filed: Aug. 11, 2021

(65) Prior Publication Data
US 2023/0050432 A1  Feb. 16, 2023

(51) Int. Cl.
  *G06F 30/30* (2020.01)
  *G03F 1/70* (2012.01)
  *G06F 30/392* (2020.01)
  *G06F 30/398* (2020.01)
  *G06F 111/20* (2020.01)

(52) U.S. Cl.
  CPC .............. *G06F 30/392* (2020.01); *G03F 1/70* (2013.01); *G06F 30/398* (2020.01); *G06F 2111/20* (2020.01)

(58) Field of Classification Search
  CPC .. G06F 30/392; G06F 30/398; G06F 2111/20; G03F 1/70
  See application file for complete search history.

(56) References Cited

U.S. PATENT DOCUMENTS

| | | |
|---|---|---|
| 8,365,103 B1 | 1/2013 | Gennari et al. |
| 8,402,396 B2 | 3/2013 | Kahng et al. |
| 8,448,100 B1 * | 5/2013 | Lin ............................ G03F 1/70 716/54 |
| 8,843,867 B2 | 9/2014 | Chase et al. |
| 9,009,632 B2 | 4/2015 | Dai et al. |
| 9,026,971 B1 | 5/2015 | Ho et al. |
| 9,613,177 B2 | 4/2017 | Yuan et al. |

(Continued)

FOREIGN PATENT DOCUMENTS

CN  108959666  12/2018

*Primary Examiner* — Jack Chiang
*Assistant Examiner* — Brandon Bowers
(74) *Attorney, Agent, or Firm* — CANTOR COLBURN LLP; Kelsey M. Skodje (57) ABSTRACT

Aspects of the invention include systems and methods configured to provide hierarchical circuit designs that makes use of a color decomposition of library cells having boundary-aware color selection. A non-limiting example computer-implemented method includes placing a plurality of shapes within a hierarchical level of a chip design. The plurality of shapes can include a top boundary shape, a bottom boundary shape, one or more center boundary shapes, and one or more internal shapes. A hierarchical hand-off region is constructed by pinning the top boundary shape to a first mask, pinning the bottom boundary shape to a second mask, and pinning the one or more center boundary shapes to a same mask. The same mask is selected from one of the first mask and the second mask.

20 Claims, 9 Drawing Sheets

(56) References Cited

U.S. PATENT DOCUMENTS

| | | | |
|---|---|---|---|
| 10,803,226 B2 | 10/2020 | Do et al. | |
| 2005/0132320 A1 | 6/2005 | Allen et al. | |
| 2010/0199253 A1* | 8/2010 | Cheng | G03F 7/70466 |
| | | | 716/55 |
| 2015/0121317 A1* | 4/2015 | Lee | G03F 1/00 |
| | | | 716/52 |
| 2018/0004883 A1* | 1/2018 | Yuan | H01L 23/528 |

* cited by examiner

HIERARCHICAL COLOR DECOMPOSITION OF LIBRARY CELLS WITH BOUNDARY-AWARE COLOR SELECTION

BACKGROUND

The present invention generally relates to circuit design. More specifically, the present invention relates to a hierarchical circuit design that makes use of a hierarchical color decomposition of library cells with boundary-aware color selection.

Conventional integrated circuits are created by patterning a wafer or substrate to form various devices and interconnections. The process for designing an IC begins generally by hierarchically defining functional components of the circuit using a hardware description language. From this high-level functional description, a physical circuit implementation dataset known as a netlist is created. In its simplest form, a netlist identifies logic cell instances from a cell library and consists of a list of the electronic components in a circuit and a list of the nodes they are connected to (i.e., cell-to-cell connectivity information).

A layout file is created using the netlist in a process known as placing and routing. The layout file assigns (i.e., places) logic cells to physical locations in the device layout and a software "router" or circuit designer routes their interconnections. In this manner, component devices and interconnections of the integrated circuit are constructed layer by layer. Once the layout file is generated, each layer is successively deposited onto the wafer and patterned using a photolithography process. These processes leverage one or more photomasks to transfer a layout pattern onto a physical layer on the wafer. Each photomask is created from the layout file of each wafer layer.

SUMMARY

Embodiments of the present invention are directed to hierarchical circuit designs that makes use of a color decomposition of library cells having boundary-aware color selection. A non-limiting example method includes placing a plurality of shapes within a hierarchical level of a chip design. The plurality of shapes can include a top boundary shape, a bottom boundary shape, one or more center boundary shapes, and one or more internal shapes. A hierarchical hand-off region is constructed by pinning the top boundary shape to a first mask, pinning the bottom boundary shape to a second mask, and pinning the one or more center boundary shapes to a same mask. The same mask is selected from one of the first mask and the second mask.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

The design of next-generation integrated circuits (ICs) (e.g., those having Very Large Scale Integration (VLSI) layouts) includes manufacturing layout verification, layout modifications, and verification of design conventions. Layout verification involves checking a proposed layout against design rules (DRC) and a comparison of extracted circuitry against a schematic netlist (LVS), often using electronic design automation (EDA) tools. To complete layout verification, a layout file is created using a netlist in a process known as placing and routing. The layout file assigns (i.e., places) logic cells to physical locations in the device layout and a software "router" or circuit designer routes their interconnections. Once the layout file is generated, each layer is successively deposited onto a wafer and patterned using a photolithography process.

IC feature geometries are continually being driven to smaller and smaller dimensions. Unfortunately, the ability to project an accurate image of increasingly smaller features onto a wafer is limited by the wavelength of the light used and the quality of the lens system. For deep sub-micron manufacturing, such as below the 22 nm node, the layout geometries on a single layer normally cannot be printed on silicon with a single lithography mask, except at great difficulty and/or with the introduction of manufacturing defects and reliability problems.

Consequently, Double Patterning Lithography (DPL) has gradually replaced conventional immersion lithography (single mask patterning) beyond the 22 nm node. DPL involves the partitioning of dense circuit patterns into two separate mask exposures to increase the effective patterning resolution—as each exposure will have a relatively decreased pattern density—improving resolution and depth of focus (DOF). DPL increases manufacturing cost due to its complex process flows and overlay control between the two patterning exposures becomes a critical issue. A key issue in DPL from the layout verification point of view is the decomposition of the layout for multiple exposures. In particular, DPL layout decomposition must satisfy the requirement that any two features, if their spacing is less than a minimum coloring spacing, will be assigned opposite colors (corresponding to the separate mask exposures). Unfortunately, in some cases a proposed layout will fail the layout decomposition check due to the presence of a shape in the layout that cannot be assigned a valid color (known as an odd-cycle violation). For example, a shape between two features, each assigned to a different mask, will fail when that shape is within the minimum coloring spacing of both features.

Odd-cycle violations offer a number of challenges to conventional layout verification schemes. One challenge is that every time a child cell is updated there is a possibility that one or more colors (mask assignments) at the boundary between the child cell and a parent cell will change. This in turn can cause a re-coloring of the parent cell, which itself can cause the re-coloring of other child cells and parent cells, eventually forcing a re-run of the entire chip coloring scheme every time a child cell is updated. This results in a large amount of re-work, often during the chip assembly process right before the completion of the chip layout and transmission to the foundry. Moreover, chip decomposition runtime is heavily slowed, as the entire chip area needs to be re-run to accommodate a child cell re-coloring.

One or more embodiments of the present invention address one or more of the above-described shortcomings by providing a hierarchical color decomposition of library cells with boundary-aware color selection. Embodiments of the present invention provide a mechanism to create hierarchical hand-off regions by fixing edge cell coloring requirements and designing edge cells such that all interior cell usage can still be decomposed with automatic tooling. In this manner, there is no need to rely on automated color decomposition at the chip level to catch odd cycle issues deep in the hierarchy.

Various schemes are offered for selecting the edge cell colors. In some embodiments of the invention, each power and ground stripe in the layout file is assigned to a given color, and boundary shapes on DPL layers (e.g. gate cut shapes [CT] between PFET/NFET regions) are "pinned" to a fixed color. In some embodiments of the invention, two added layers of complexity can be added (together or separately) to the coloring scheme. First, instead of forcing same-color spacings from edge cell to internal cells, different-color spacings can be enabled. In this scenario, we check and prohibit any usage of an even number of cells that contain less than a same-color spacing. In other words, usages of an even number of cells that contain one or more different-color spacings. For example, in a group of four cells provisionally colored RED-GREEN-X-RED, X is marked as a prohibited cell as a valid color will not be possible. Second, library cells can be prohibited from creating constructs where the spacing from a boundary shape to an internal power rail would force a given color on the boundary shape (due, e.g., to same-color spacings). These problems may exist within a cell, across neighboring cells, or even across an entire circuit row in a given layer of hierarchy, making this a particularly challenging design constraint unless all shapes are required to be designed to same-color spacings (with associated area penalty). Observe that, as an extreme worst-case, a circuit row might be populated by fill cells where each cell has internal same-color spacings. This circuit row may span thousands of cells across millimeters of chip area, and if a minor modification is made that happens to convert the number of cells from an odd number of cells to an even number of cells (e.g. by replacing two cells occupying 4 pitches to one occupying 8 pitches), an odd-cycle violation will be created that is very computationally intensive to find and would flag thousands of shapes, making the identification of a solution very challenging.

Advantageously, a hierarchical color decomposition configured according to one or more embodiments offers several technical solutions over conventional layout verification schemes. As an initial matter, this type of per-hierarchy technique enables correct-by-construction color decompositions, where each hierarchical block can check their results and can guarantee colorability across hierarchies. Accordingly, odd-cycle violations can be fixed modularly without forcing re-work of the entire layout, even when those odd-cycle violations are found during chip assembly. Chip decomposition runtime is also improved, as designers only need to decompose the regions owned by the chip level of hierarchy and can plug in the separately computed (and verified) color solutions for all child levels of hierarchy. Moreover, hierarchical color decompositions according to one or more embodiments enable child updates to be "plug and play" at the chip level with packaged coloring solutions (instead of, e.g., having to re-run chip coloring every time a child cell is updated).

Figure 1:
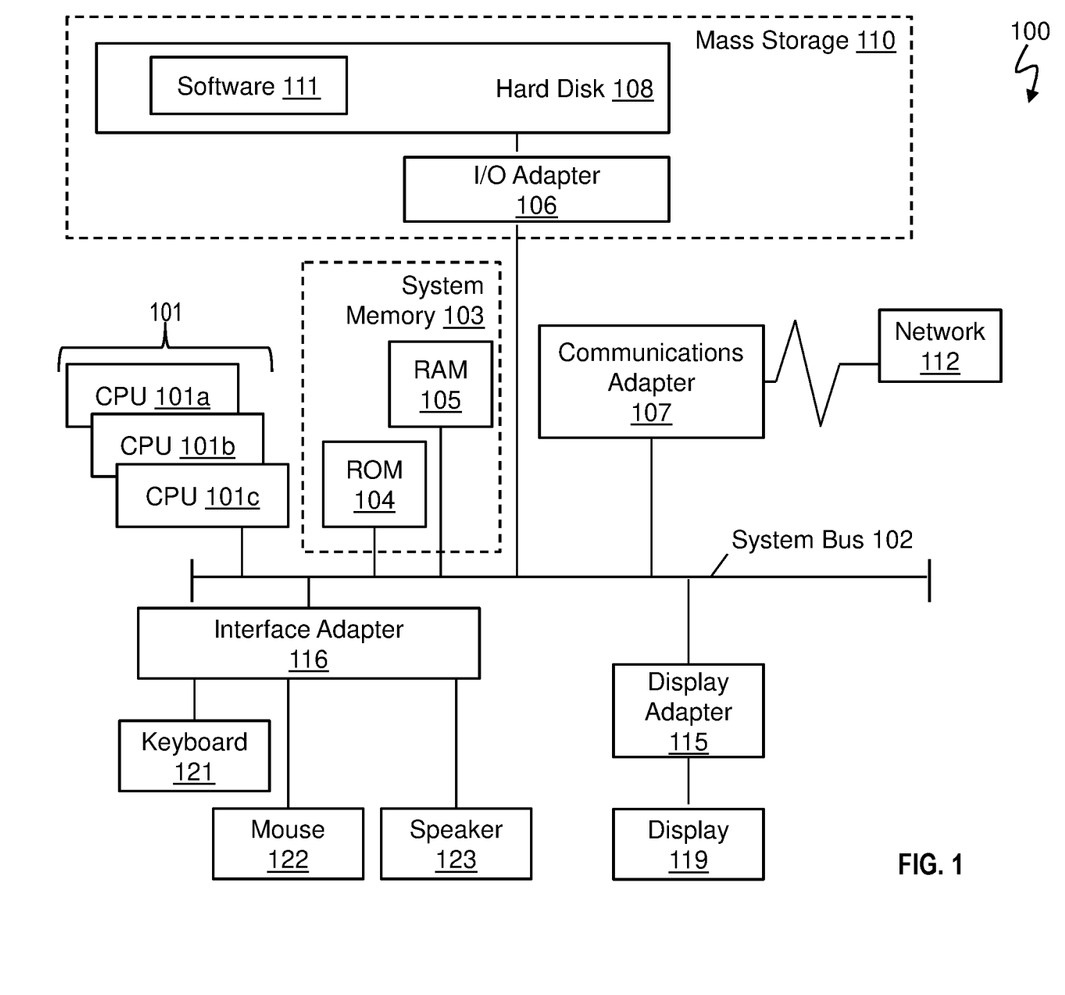
FIG. 1 depicts a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node (e.g., a node 10 of FIG. 9 below). Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
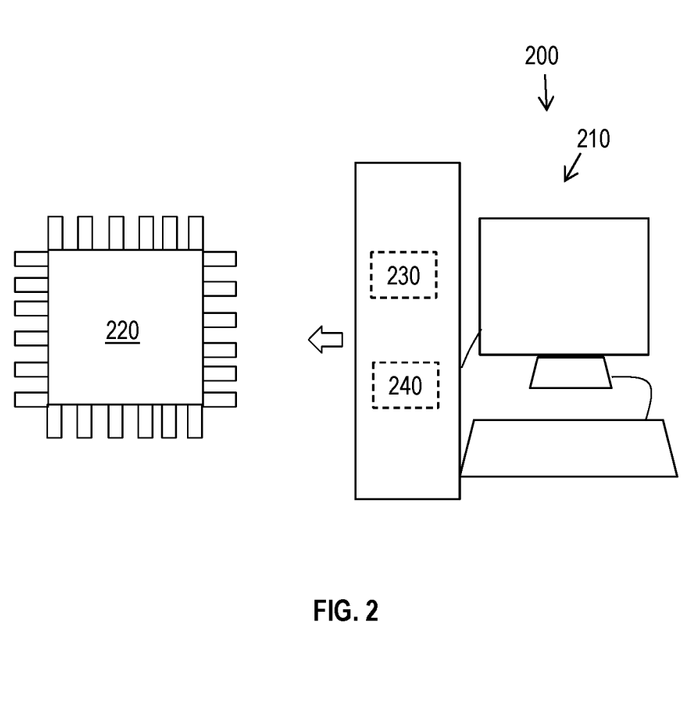
FIG. 2 is a block diagram of a system to perform a hierarchical color decomposition of library cells with boundary-aware color selection in accordance with one or more embodiments of the present invention.

FIG. 2 is a block diagram of a system 200 to perform a hierarchical color decomposition of library cells with boundary-aware color selection according to embodiments of the invention. The system 200 includes processing circuitry 210 used to generate the design that is ultimately fabricated into an integrated circuit 220. The steps involved in the fabrication of the integrated circuit 220 are well-known and briefly described herein. Once the physical layout is finalized, based, in part, on a hierarchical color decomposition with boundary-aware color selection according to embodiments of the invention, to facilitate optimization of the routing plan, the finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 3.

Figure 3:
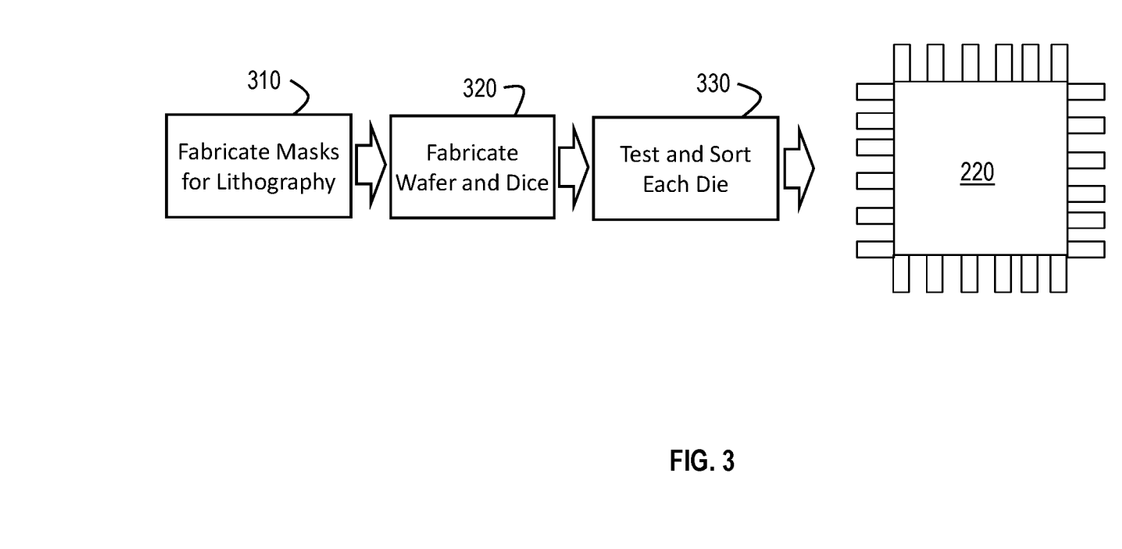
FIG. 3 is a process flow of a method of fabricating an integrated circuit in accordance with one or more embodiments of the present invention.

FIG. 3 is a process flow of a method of fabricating an integrated circuit (e.g., the IC 220 of FIG. 2) according to exemplary embodiments of the invention. Once the physical design data is obtained, based, in part, on a hierarchical color decomposition with boundary-aware color selection, the integrated circuit 220 can be fabricated according to known processes that are generally described with reference to FIG. 3. Generally, a wafer with multiple copies of the final design is fabricated and cut (i.e., diced) such that each die is one copy of the integrated circuit 220. At block 310, the processes include fabricating masks for lithography based on the finalized physical layout. At block 320, fabricating the wafer includes using the masks to perform photolithography and etching. Once the wafer is diced, testing and sorting each die is performed, at block 330, to filter out any faulty die.

Figure 4:
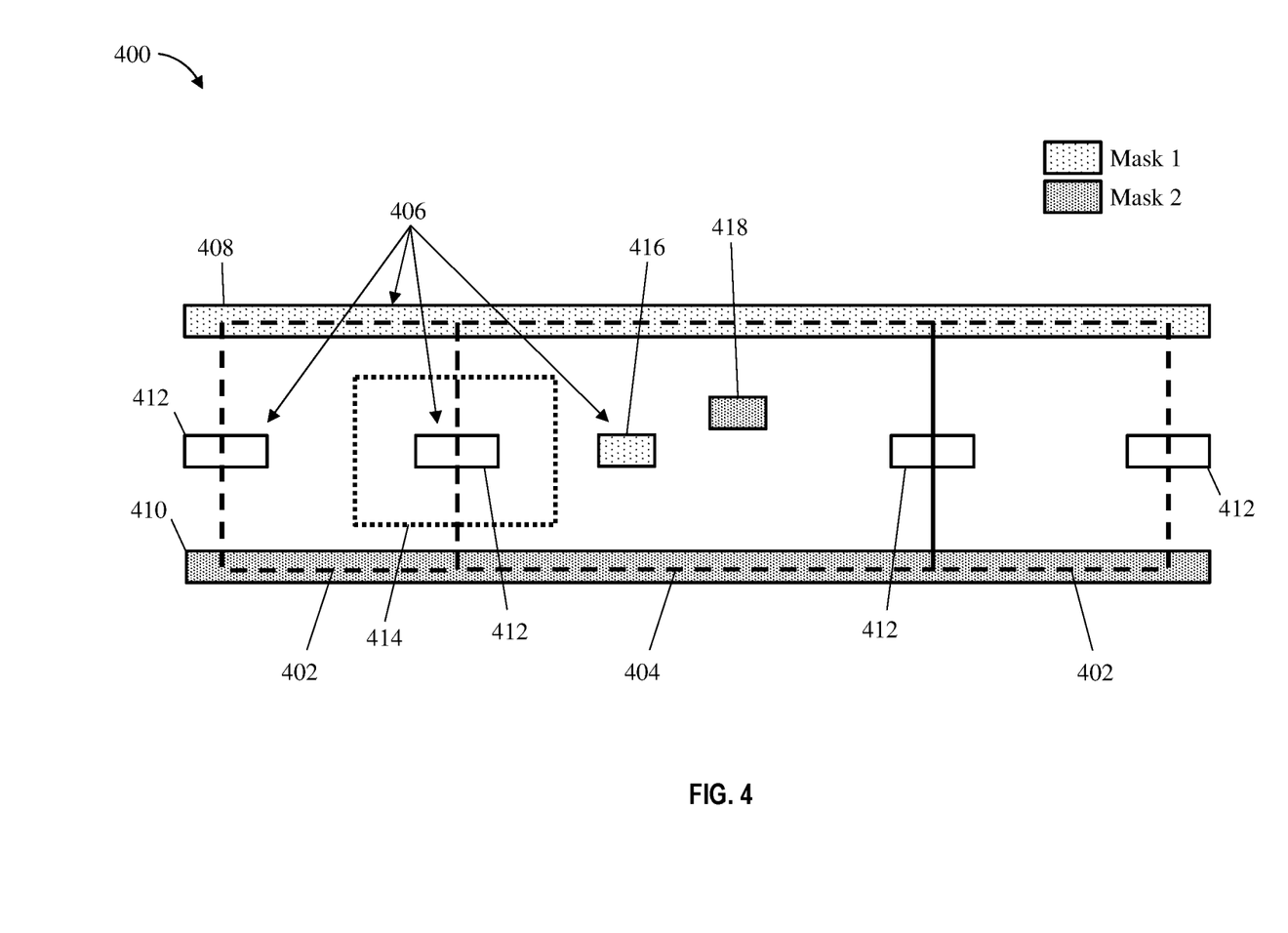
FIG. 4 illustrates an example hierarchical circuit design using a color decomposition of library cells with boundary-aware color selection in accordance with one or more embodiments of the present invention.

FIG. 4 is a hierarchical circuit design 400 using a color decomposition of library cells with boundary-aware color selection in accordance with one or more embodiments of the present invention. As shown in FIG. 4, the hierarchal circuit design 400 can include one or more edge cells 402 and one or more internal cells 404. In some embodiments of the invention, a plurality of internal shapes 406 (also referred to as cell level markers) are arranged throughout the one or more cells 402, 404. It should be understood that the hierarchical circuit design 400 is provided as an example for discussion. Other circuit designs are possible. In some embodiments of the invention, the hierarchical circuit design 400 is a portion of a complete hierarchical circuit design. While not shown for ease of illustration and discussion, in some embodiments of the invention the cells 402, 404 together define a child cell and/or a parent cell within the hierarchical circuit design.

In some embodiments of the invention, the internal shapes 406 include one or more boundary shapes, such as, for example, a top boundary shape 408, a bottom boundary shape 410, and one or more center boundary shapes 412. In some embodiments of the invention, the top boundary shape 408 is a power stripe (or ground stripe) while the bottom boundary shape 410 is a ground stripe (or power stripe). In some embodiments of the invention, the center boundary shapes 412 are positioned at the boundaries of the cells 402 and 404 midway between the top boundary shape 408 and the bottom boundary shape 410.

In some embodiments of the invention, the internal shapes 406 can be colored using a first mask (e.g., Mask 1) and a second mask (e.g., Mask 2). In some embodiments of the invention, the internal shapes 406 are colored (i.e., assigned to a mask) in a manner that leverages boundary-aware color selection. For example, in some embodiments of the invention, the top boundary shape 408 is fixed (or "pinned") to Mask 1, while the bottom boundary shape 410 is fixed to Mask 2.

Due to inherent limitations in multi-mask lithographic patterning (e.g., DPL), two shapes sharing the same mask cannot be placed arbitrarily close together. Instead, shapes that are within the single mask patterning limit are forced onto two separate masks. This distance is a function of the underlying lithographic process relied upon for patterning and/or the quality of the lithographic tooling available. A "different-color" spacing refers to the maximum distance between two shapes that is sufficiently short to force a different coloring of those respective shapes. In other words, two shapes that are sufficiently close together (i.e., between the "different-color" spacing and the "same-color" spacing) must be assigned to separate masks. A "same-color" spacing refers to the minimum distance allowed between two shapes on the same mask (i.e., the distance between shapes assigned to the same color). Due to mask patterning limitations, the same-color spacing will be larger than the different-color spacing. Stated another way, two shapes can be patterned closer together by putting those shapes on different masks. As a direct result, placing a proposed shape next to an existing shape can result in a few different outcomes. The placing can be legal (i.e., satisfy both spacing requirements), the placing can violate the same-color spacing but satisfy the different-color spacing (i.e., 2 masks would be required to achieve), and the placing can be illegal (i.e., both spacing requirements are violated).

In some embodiments of the invention, leveraging a boundary-aware color selection includes constructing a keep-out region 414 that can be placed around each of the center boundary shapes 412. In some embodiments of the invention, the keep-out region 414 prohibits the placement of any shape that would overlap or cross the keep-out region 414. In some embodiments of the invention, the size (e.g., edge-to-edge distance) of the keep-out region 414 is defined as the minimum distance required to ensure that no "different-color" spacings can be imposed on the respective center boundary shape. In other words, the keep-out region 414 prevents the placement of any shapes that, if placed, would be forced to different mask than the respective center boundary shape. In this manner, all remaining internal shapes (e.g., shape 416 and 418) can be arbitrarily colored without impacting the color(s) of the center boundary shapes 412. For example, shape 416 can be assigned to Mask 1 and shape 418 (meeting the "different-color" spacing to shape 416) can be assigned to Mask 2 without forcing a coloring on any of the center boundary shapes 412.

Constructing the color decomposition (color assignments) of cells with boundary-aware color selection in this manner offers several advantages. All remaining interior shapes are easily colorable without having to worry about the colors assigned to the center boundary shapes 412. This enables a designer to lock all the center boundary shapes 412 to a consistent color (either Mask 1 or Mask 2) on both sides of a hierarchical boundary. This type of coloring also ensures that selecting a color for the center boundary shapes 412 (e.g. Mask 1) will not cause any illegal coloring conditions (referred to as odd-cycle violations) with respect to any other shape within the hierarchical boundary.

Constructing and coloring the hierarchical circuit design 400 in this manner ensures that all edge elements within the hierarchy (e.g., the top boundary shape 408, the bottom boundary shape 410, and the center boundary shapes 412) will have a known, consistent coloring regardless of hierarchical level. In essence, we create hierarchical hand-off regions by fixing edge cell coloring requirements. This per-hierarchy technique enables correct-by-construction color decomposition, where each macro can check their results and guarantee colorability across the hierarchy. Moreover, internal coloring changes (e.g., changing shape 416 to Mask 2, shape 418 to Mask 1, etc.) will have no impact outside of the current hierarchical level, as the boundary element colorings will not change.

Figure 5:
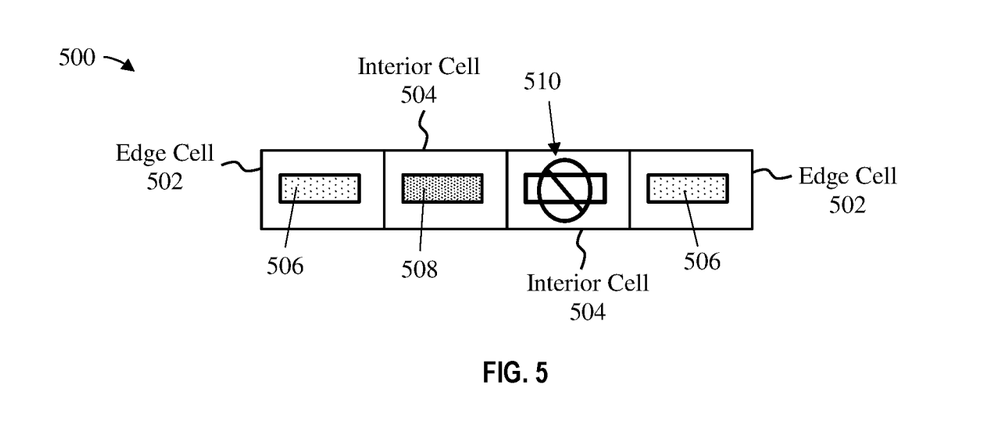
FIG. 5 illustrates an example hierarchical circuit design in accordance with one or more embodiments of the present invention.

In some embodiments of the invention, the color decomposition of cells within a hierarchical circuit design includes an added layer of complexity, whereby, instead of forcing same-color spacings from edge cells to internal cells, different-color spacings are allowed so long as any usage of an even number of cells that contain same-color spacings is prohibited. This coloring requirement is illustrated in FIG. 5. As shown in FIG. 5, a hierarchical circuit design 500 can include an even number of cells (e.g., two edge cells 502 and two internal cells 504). In some embodiments of the invention, each of the cells 502, 504 are assigned to a first mask 506 or a second mask 508. In some embodiments of the invention, the hierarchical circuit design 500 is checked to determine a cell count (here, four cells 502, 504). As this is an even number of cells, in some embodiments of the invention, the hierarchical circuit design 500 is further checked to determine whether all cells contain a diff-color spacing. Continuing from the previous example, a diff-color spacing exists, and consequently, the right-most interior cell 504 is prohibited. In another embodiment of the invention, the hierarchical circuit design 500 is checked to determine whether any cell satisfies a same-color spacing requirement, which effectively decouples the left half of the row's color solution from the right half of the row's color solution, guaranteeing colorability.

Figure 6:
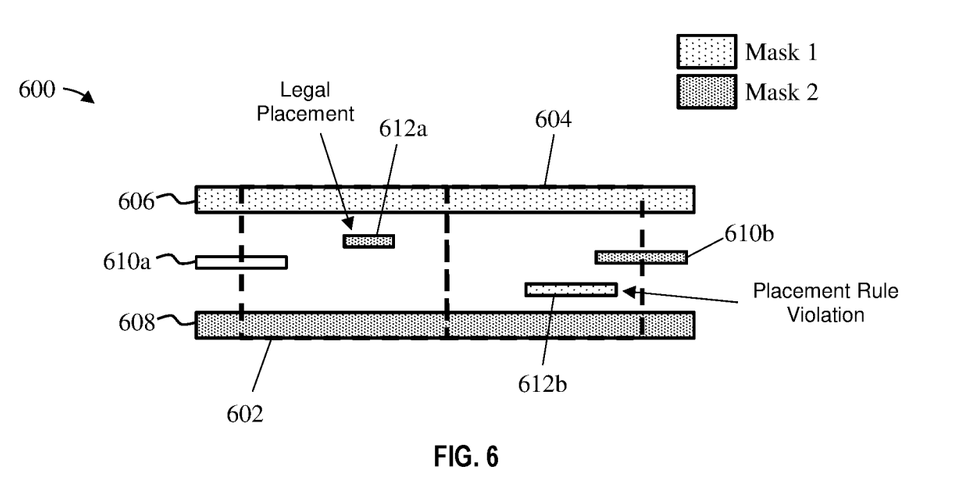
FIG. 6 illustrates an example hierarchical circuit design having a placement rule violation in accordance with one or more embodiments of the present invention.

FIG. 6 illustrates a hierarchical circuit design 600 having a placement rule violation in accordance with one or more embodiments of the present invention. As shown in FIG. 6, the hierarchal circuit design 600 can include one or more edge cells 602 and one or more internal cells 604. In some embodiments of the invention, the hierarchal circuit design 600 can include a top boundary shape 606, a bottom boundary shape 608, one or more center boundary shapes 610a, 610b, and one or more internal shapes 612a, 612b. In some embodiments of the invention, the top boundary shape 606 and the bottom boundary shape 608 are pre-assigned (through convention of the boundary-aware color selection scheme) to Masks 1 and 2, respectively.

As further shown in FIG. 6, the placement of the internal shape 612a is sufficiently close to the top boundary shape 606 that an assignment to the second mask (e.g., Mask 2) is required. Similarly, the placement of the internal shape 612b is sufficiently close to the bottom boundary shape 608 that an assignment to the first mask (e.g., Mask 1) is required. In some embodiments of the invention, the placement of the shape 612*a* is outside the "different-color" spacing of the center boundary shape 610*a* (i.e., sufficiently remote from the center boundary shape 610*a* such that same colorings are possible). Conversely, the placement of the shape 612*b* is within the "different-color" spacing of the center boundary shape 610*b*. Consequently, the placement of the shape 612*b* would force a color (here, Mask 2) upon the center boundary shape 610*b* and is an illegal placement.

Figure 7:
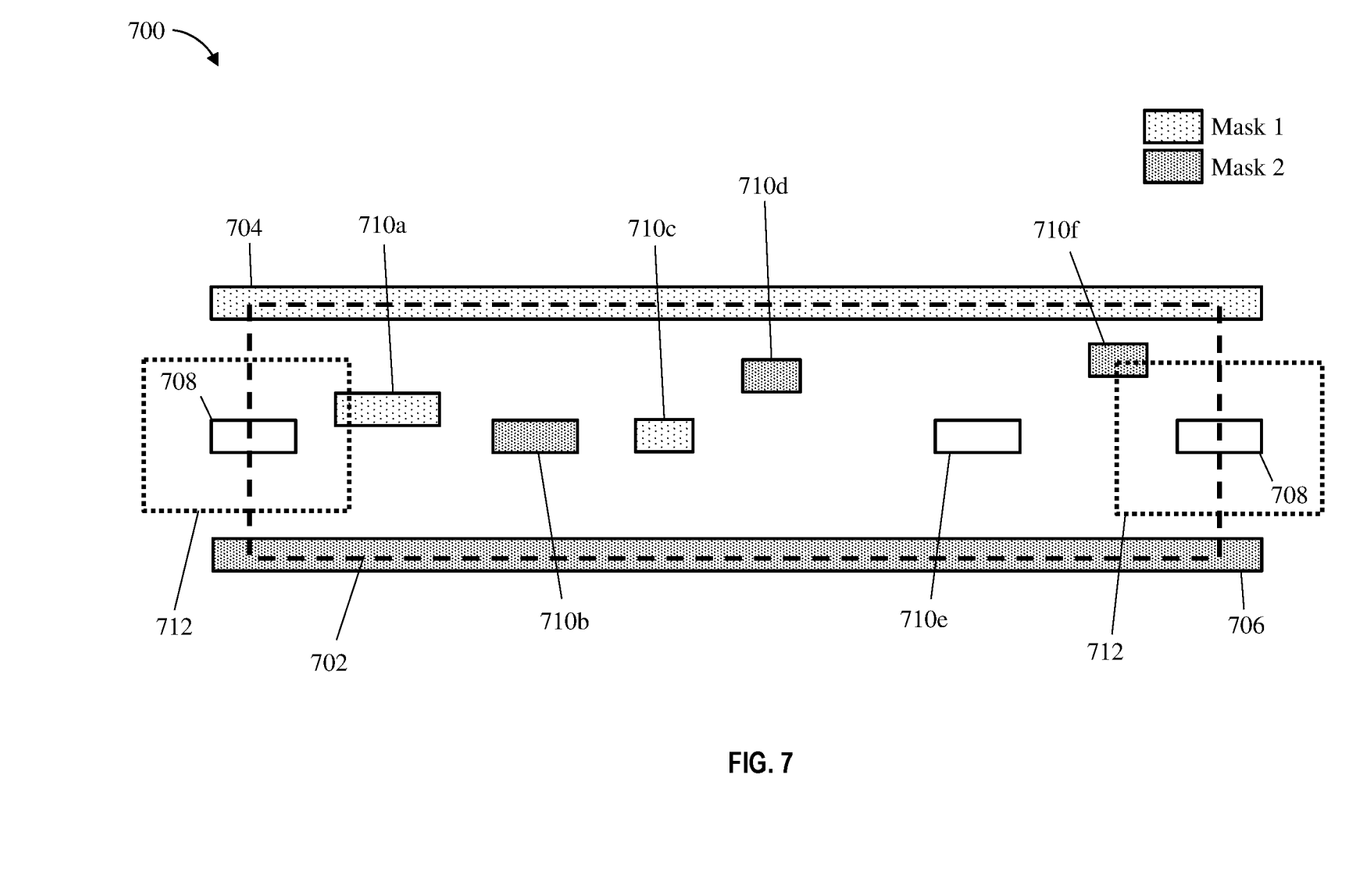
FIG. 7 illustrates an example hierarchical circuit design having a placement rule violation in accordance with one or more embodiments of the present invention.

FIG. 7 illustrates a hierarchical circuit design 700 having a placement rule violation in accordance with one or more embodiments of the present invention. As shown in FIG. 7, the hierarchal circuit design 700 can include a hierarchy level 702 (child and/or parent). In some embodiments of the invention, the hierarchal circuit design 700 can include a top boundary shape 704, a bottom boundary shape 706, one or more center boundary shapes 708, and one or more internal shapes 710*a*, 710*b*, 710*c*, 710*d*, 710*e*, and 710*f*. In some embodiments of the invention, the top boundary shape 704 and the bottom boundary shape 706 are pre-assigned (via convention of the boundary-aware color selection scheme) to Masks 1 and 2, respectively. In some embodiments of the invention, keep-out regions 712 are placed around each of the center boundary shapes 708.

Consider, for example, potential legal colorings for the shapes in the hierarchical circuit design 700. In this case, shape 710*d* is close enough to the top boundary shape 704 that shape 710*d* is forced to Mask 2, which in turn forces shape 710*c* to Mask 1, which in turn forces shape 710*b* to Mask 2, which in turn would force shape 710*a* to Mask 1. Ultimately, this cascade of forced colorings would result in a strict assignment of the left-most of the center boundary shapes 708 to Mask 2.

Under conventional placement schemes the proposed coloring is allowable (no strict coloring violations exist). However, forcing the left-most of the center boundary shapes 708 to a specific color potentially breaks our hierarchical consistency requirement (recall that we want to make sure we can always pick the same color across all hierarchical boundaries for the center boundary shapes). Here, for example, if the left-most of the center boundary shapes 708 is forced to Mask 2, a same-coloring of the right-most of the center boundary shapes 708 is not possible—shape 710*f* forces the right-most of the center boundary shapes 708 to Mask 1. Having the center boundary shapes 708 forced to separate masks prevents us from being able to freely place this cell (hierarchy level 702) within a parent cell (not shown) without having to worry about the boundary color requirements. In some embodiments of the invention, while conventionally allowable, a keep-out placement rule is enforced that prevents the placement of either or both of the shapes 710*a*, 710*f* as the placement of those shapes forces the two center boundary shapes 708 to different masks.

Figure 8:
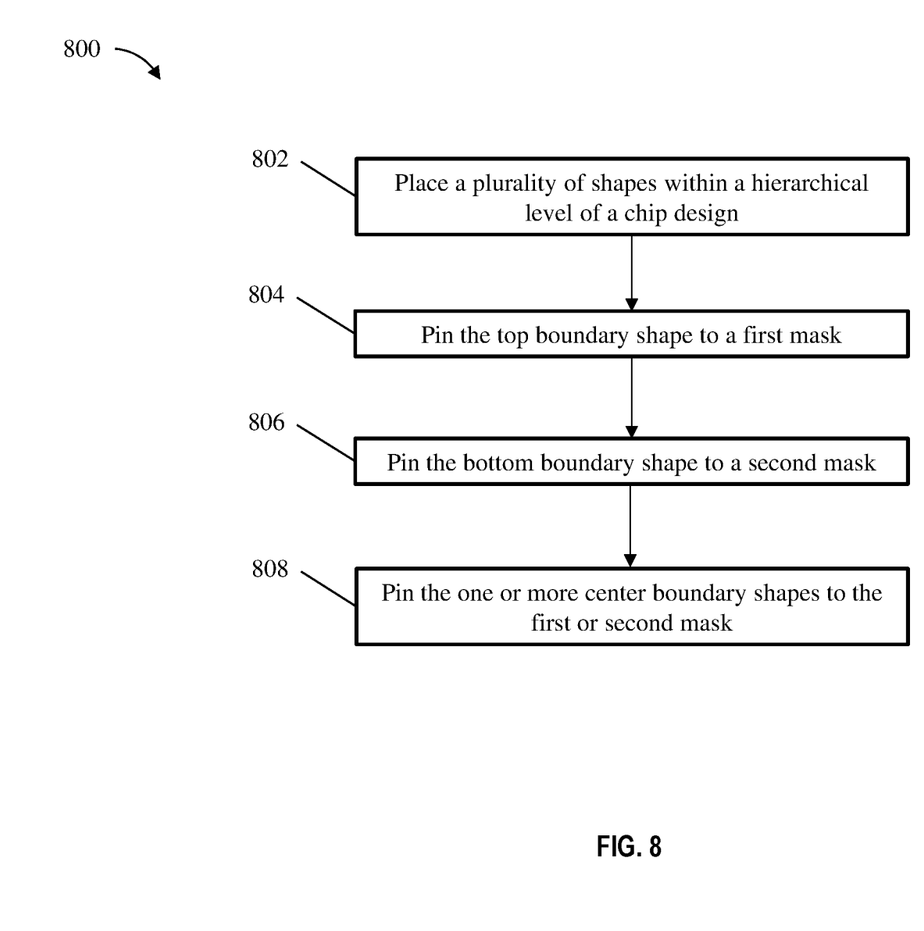
FIG. 8 is a flowchart in accordance with one or more embodiments of the present invention.

Referring now to FIG. 8, a flowchart 800 for performing a hierarchical color decomposition of library cells with boundary-aware color selection is generally shown according to an embodiment. The flowchart 800 is described in reference to FIGS. 1-7 and may include additional blocks not depicted in FIG. 8. Although depicted in a particular order, the blocks depicted in FIG. 8 can be rearranged, subdivided, and/or combined. At block 802, a plurality of shapes is placed within a hierarchical level of a chip design. In some embodiments of the invention, the plurality of shapes include a top boundary shape, a bottom boundary shape, one or more center boundary shapes, and one or more internal shapes. In some embodiments of the invention, the top boundary shape includes a power stripe and the bottom boundary shape includes a ground stripe.

At block 804, the top boundary shape is pinned to a first mask. At block 806, the bottom boundary shape is pinned to a second mask. At block 808, the one or more center boundary shapes are pinned to a same mask. The same mask is selected from one of the first mask and the second mask. Pinning the top boundary shape, the bottom boundary shape, and the one or more center boundary shapes in this manner defines a "boundary-aware" color selection. As discussed previously, a boundary-aware color selection scheme allows for the creation of hierarchical hand-off regions having fixed edge cell coloring requirements.

The method can further include preventing any usage of an even number of cells in the hierarchical level containing less than a same-color spacing. In other words, preventing any usage of an even number of cells having one or more different-color spacings. In some embodiments of the invention, the placement of a new cell in the hierarchical level is prevented in response to determining that placing the new cell results in an even number of cells containing a same-color spacing.

The method can also include constructing a keep-out region around each of the one or more center boundary shapes. In some embodiments of the invention, a boundary of the keep-out region is defined by a minimum same-coloring distance from the respective center boundary shape (i.e., the keep-out region defines the boundary around the center boundary shape within which a different mask is required). In some embodiments of the invention, placement of a new cell in the hierarchical level is prevented in response to determining that placing the new cell results in a violation of the keep-out region.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
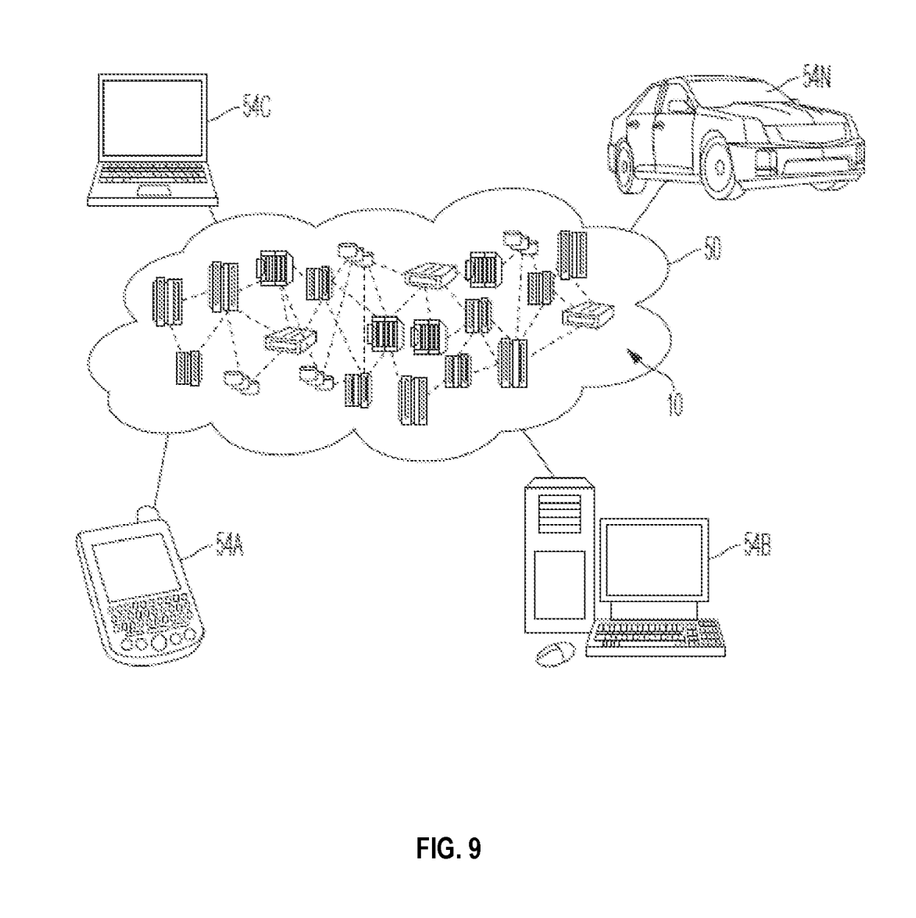
FIG. 9 depicts a cloud computing environment according to one or more embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
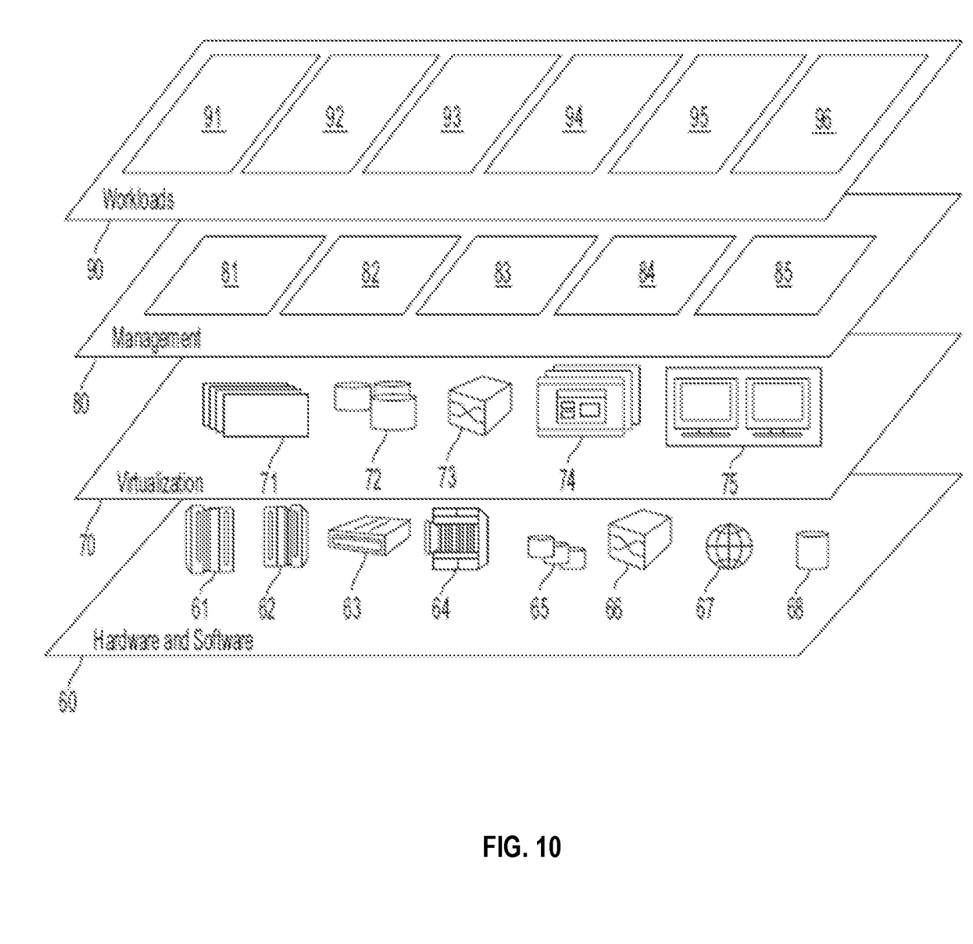
FIG. 10 depicts abstraction model layers according to one or more embodiments of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications 96 (e.g., software applications 206 of FIG. 2), etc. Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:
1. A computer-implemented method comprising:
placing a plurality of shapes within a hierarchical level of a chip design having two or more edge cells and one or more internal cells, the plurality of shapes comprising a top boundary shape common to at least two cells of the two or more edge cells and the one or more internal cells, a bottom boundary shape common to the at least two cells of the two or more edge cells and the one or more internal cells, one or more center boundary shapes, and one or more internal shapes, the one or more center boundary shapes positioned at boundaries of the two or more edge cells and internal cells midway between the top boundary shape and the bottom boundary shape;
pinning the top boundary shape to a first mask;
pinning the bottom boundary shape to a second mask; and pinning the one or more center boundary shapes to a same mask, wherein the same mask is selected from one of the first mask and the second mask.

2. The computer-implemented method of claim 1 further comprising preventing any usage of an even number of cells in the hierarchical level containing one or more different-color spacings.

3. The computer-implemented method of claim 2 further comprising preventing placement of a new cell in the hierarchical level in response to determining that placing the new cell results in an even number of cells containing one or more different-color spacings.

4. The computer-implemented method of claim 1 further comprising constructing a keep-out region around each of the one or more center boundary shapes.

5. The computer-implemented method of claim 4, wherein a boundary of the keep-out region is defined by a minimum same-coloring distance from the respective center boundary shape.

6. The computer-implemented method of claim 5 further comprising preventing placement of a new cell in the hierarchical level in response to determining that placing the new cell results in a violation of the keep-out region.

7. The computer-implemented method of claim 1, wherein the top boundary shape comprises a power stripe, and wherein the bottom boundary shape comprises a ground stripe.

8. A system comprising a memory having computer readable instructions and one or more processors for executing the computer readable instructions, the computer readable instructions controlling the one or more processors to perform operations comprising:
    placing a plurality of shapes within a hierarchical level of a chip design having two or more edge cells and one or more internal cells, the plurality of shapes comprising a top boundary shape common to at least two cells of the two or more edge cells and the one or more internal cells, a bottom boundary shape common to the at least two cells of the two or more edge cells and the one or more internal cells, one or more center boundary shapes, and one or more internal shapes, the one or more center boundary shapes positioned at boundaries of the two or more edge cells and internal cells midway between the top boundary shape and the bottom boundary shape;
    pinning the top boundary shape to a first mask;
    pinning the bottom boundary shape to a second mask; and
    pinning the one or more center boundary shapes to a same mask, wherein the same mask is selected from one of the first mask and the second mask.

9. The system of claim 8 further comprising preventing any usage of an even number of cells in the hierarchical level containing one or more different-color spacings.

10. The system of claim 9 further comprising preventing placement of a new cell in the hierarchical level in response to determining that placing the new cell results in an even number of cells containing one or more different-color spacings.

11. The system of claim 8 further comprising constructing a keep-out region around each of the one or more center boundary shapes.

12. The system of claim 11, wherein a boundary of the keep-out region is defined by a minimum same-coloring distance from the respective center boundary shape.

13. The system of claim 12 further comprising preventing placement of a new cell in the hierarchical level in response to determining that placing the new cell results in a violation of the keep-out region.

14. The system of claim 8, wherein the top boundary shape comprises a power stripe, and wherein the bottom boundary shape comprises a ground stripe.

15. A computer program product comprising a computer readable storage medium having program instructions embodied therewith, the program instructions executable by one or more processors to cause the one or more processors to perform operations comprising:
    placing a plurality of shapes within a hierarchical level of a chip design having two or more edge cells and one or more internal cells, the plurality of shapes comprising a top boundary shape common to at least two cells of the two or more edge cells and the one or more internal cells, a bottom boundary shape common to the at least two cells of the two or more edge cells and the one or more internal cells, one or more center boundary shapes, and one or more internal shapes, the one or more center boundary shapes positioned at boundaries of the two or more edge cells and internal cells midway between the top boundary shape and the bottom boundary shape;
    pinning the top boundary shape to a first mask;
    pinning the bottom boundary shape to a second mask; and
    pinning the one or more center boundary shapes to a same mask, wherein the same mask is selected from one of the first mask and the second mask.

16. The computer program product of claim 15 further comprising preventing any usage of an even number of cells in the hierarchical level containing one or more different-color spacings.

17. The computer program product of claim 16 further comprising preventing placement of a new cell in the hierarchical level in response to determining that placing the new cell results in an even number of cells containing one or more different-color spacings.

18. The computer program product of claim 15 further comprising constructing a keep-out region around each of the one or more center boundary shapes.

19. The computer program product of claim 18, wherein a boundary of the keep-out region is defined by a minimum same-coloring distance from the respective center boundary shape.

20. The computer program product of claim 19 further comprising preventing placement of a new cell in the hierarchical level in response to determining that placing the new cell results in a violation of the keep-out region.

* * * * *